United States Patent
Sato

(10) Patent No.: US 7,369,689 B2
(45) Date of Patent: May 6, 2008

(54) PERSONAL AUTHENTICATION SYSTEM AND PERSONAL AUTHENTICATION METHOD

(75) Inventor: Hideo Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 852 days.

(21) Appl. No.: 10/623,524

(22) Filed: Jul. 22, 2003

(65) Prior Publication Data

US 2004/0136573 A1    Jul. 15, 2004

(30) Foreign Application Priority Data

Aug. 2, 2002    (JP) ............... 2002-225716

(51) Int. Cl.
*G06K 9/00*    (2006.01)
(52) U.S. Cl. ............... 382/124; 382/115; 340/5.53; 340/5.83
(58) Field of Classification Search ............... 382/115, 382/124–125; 340/5.53, 5.83; 356/71
See application file for complete search history.

(56) References Cited

U.S. PATENT DOCUMENTS

| | | | | |
|---|---|---|---|---|
| 5,559,504 A | * | 9/1996 | Itsumi et al. ............... 340/5.53 |
| 5,887,140 A | * | 3/1999 | Itsumi et al. ............... 709/225 |
| 5,995,643 A | * | 11/1999 | Saito ............... 382/124 |
| 6,898,299 B1 | * | 5/2005 | Brooks ............... 382/115 |

\* cited by examiner

*Primary Examiner*—Bhavesh M. Mehta
*Assistant Examiner*—John B Strege
(74) *Attorney, Agent, or Firm*—Oblon, Spivak, McClelland, Maier & Neustadt, P.C.

(57) ABSTRACT

A personal authentication system includes a first electrode in a first skin area of a person to be authenticated, a second electrode in a second skin area apart from the first skin area, a measuring unit, and an authentication unit. The contact surface between the second electrode and the second skin area has a predetermined area. The measuring unit measures the resistance distribution of the epidermis in the first skin area based on a predetermined voltage that is applied between the first and second electrodes and a current flowing between the first and second electrodes through the body of the person to be authenticated. The authentication unit compares the resistance distribution of the epidermis in the first skin area of the person to be authenticated with at least part of the stored resistance distribution of the epidermis of a validated person to validate the person to be authenticated.

9 Claims, 13 Drawing Sheets

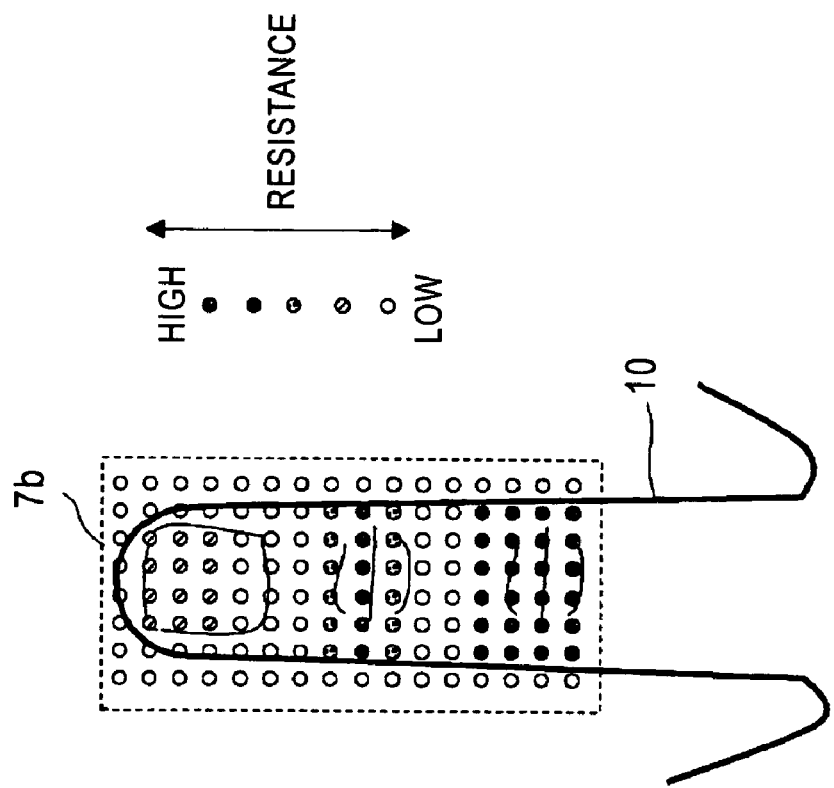
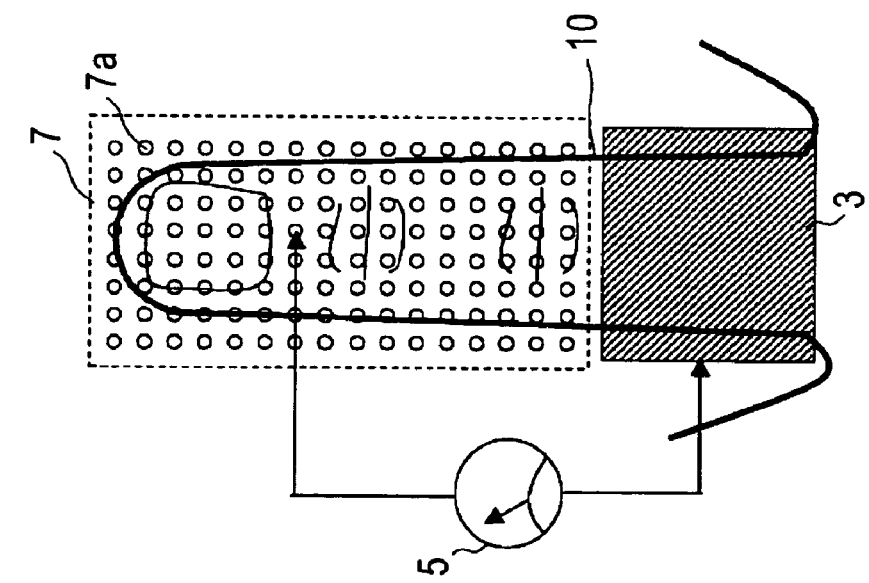
FIG. 3A
FIG. 3B

PERSONAL AUTHENTICATION SYSTEM AND PERSONAL AUTHENTICATION METHOD

BACKGROUND OF THE INVENTION

1. Field of the Invention

The present invention relates to personal authentication systems and personal authentication methods and, more particularly, to a personal authentication system and a personal authentication method using the electrical resistance of the epidermis.

2. Description of the Related Art

In recent years, along with the popularization of the Internet, the applicable range of networks has been rapidly expanding and the value and amount of distributed information has been increasing year after year. This has been accompanied with an increase in illegal activity and crimes concerning a variety of electronic information that has raised social issues and the effects of the social issues tend to increase. Such illegal activity includes physical intrusion into computer facilities, illegal use of equipment, and illegal access from networks.

Countermeasures against such an illegal activity or crimes include, first, enhanced physical security for preventing illegal access to facilities and, second, enhanced information security for preventing illegal network intrusion or illegal access to information. Secure user identification provides effective means for both countermeasures. For example, the physical feature of a user is used to perform personal authentication.

As computer technologies and communication technologies progress more and more, electrical equipment used in ordinary life will have a CPU or a memory and will be operated with given instructions or stored data. Legal users are victims to illegal access to such equipment and illegal operation thereof. Secure identification of the users is effective means for preventing such illegal access and illegal operation.

Ultimate identification means is a biometrics authentication using physical features. Although fingerprints have been used for a long time in biometrics authentication, a personal authentication method using new biological information has been of interest in recent years. For example, it is hoped that an iris authentication technology using the pattern of the iris of a human eye that differs from person to person comes into wide use because of its high precision.

However, since fingerprints or irises are external biological features, high-precision reproduction is possible and thus undesirably permits an imposter to pose as an authenticated person. Since fingerprints or the like stay at places that are touched with a hand, they can be reproduced by current state-of-the-art technologies but the reproduced fingerprints or the like cannot be identified by common fingerprint identification systems.

Although methods that use internal biological information have been suggested as methods for overcoming the drawbacks of the existing authentication technologies described above, their size, cost, and limited applicable range cause problems, thus disadvantageously providing low practicability.

SUMMARY OF THE INVENTION

Accordingly, an object of the present invention is to provide a personal authentication system that has a simple structure and is capable of authenticating individuals by using biological information that cannot be externally detected, and a personal authentication method using the system.

The present invention provides, in its first aspect, a personal authentication system including a first electrode that is disposed in a first skin area of a person to be authenticated, a second electrode that is disposed in a second skin area apart from the first skin area, a measuring unit, and an authentication unit. The contact surface between the second electrode and the second skin area has a predetermined area such that the resistance of the epidermis in the second skin area becomes substantially zero when an electric potential is generated between the first electrode and the second electrode. The measuring unit measures the resistance distribution of the epidermis in the first skin area based on a predetermined voltage that is applied between the first electrode and the second electrode and a current flowing between the first electrode and the second electrode through the body, including the skin, of the person to be authenticated. The authentication unit stores the resistance distribution data, which is measured in advance, of the epidermis in the first skin area of a validated person and compares the resistance distribution data of the epidermis in the first skin area of the person to be authenticated, the resistance distribution being measured with the measuring unit, with at least part of the stored resistance distribution data of the epidermis of the validated person to validate the person to be authenticated.

The contact surface between the first electrode and the first skin area preferably has a predetermined area such that the resistance of the epidermis in the first skin area does not substantially vary when an electric potential is generated between the first electrode and the second electrode.

The distance between the first electrode and the second electrode is preferably longer than a distance in a case in which electrical leakage begins to occur between the first electrode and the second electrode through skin upon generation of an electric potential between the first electrode and the second electrode.

First electrodes may be disposed on a plurality of fingers of the person to be authenticated. The measuring unit may measure the resistance distribution of the epidermis on a plurality of fingers to identify the positions in the hands of the person to be authenticated based on the resistance distribution on the epidermis near the joints of the fingers.

The measuring unit may measure the two-dimensional resistance distribution of the epidermis in the first skin area to determine the patterns on the surface in the first skin area based on the measured two-dimensional resistance distribution.

The second electrode may be a plane electrode.

The present invention provides, in its second aspect, a personal authentication method including the step of measuring the resistance distribution of the epidermis in the first skin area, based on a voltage that is applied between the first electrode disposed in a first skin area of a person to be authenticated and a second electrode that is disposed in a second skin area apart from the first skin area and a current flowing between the first electrode and the second electrode through the body, including the skin, of the person to be authenticated. The contact surface between the second electrode and the second skin area has a predetermined area such that the resistance of the epidermis in the second skin area becomes substantially zero when an electric potential is generated between the first electrode and the second electrode. The personal authentication method also includes the step of comparing the resistance distribution data of the epidermis in the first skin area of a person to be authenticated with at least part of the resistance distribution data, which is measured in advance, of the epidermis of a validated person to validate the person to be authenticated. The resistance distribution is measured with the measuring unit.

The present invention provides, in its third aspect, a personal authentication system including a first electrode that is disposed in a first skin area of a person to be authenticated, a second electrode that is disposed in a second skin area apart from the first skin area and has a sufficiently larger area than the first electrode, a measuring unit, and an authentication unit. The measuring unit measures the resistance distribution of the epidermis in the first skin area based on a predetermined voltage that is applied between the first electrode and the second electrode and a current flowing between the first electrode and the second electrode through the body, including the skin, of the person to be authenticated. The authentication unit compares the measured resistance distribution with at least part of the resistance distribution data of the epidermis of a validated person, who is registered in advance, to validate the person to be authenticated.

The second electrode may be a plane electrode.

According to the present invention, the resistance distribution of the epidermis of a person is measured to extract the features of the person for personal authentication. Since the epidermis of a person is highly insulative and the dermis under the epidermis has relatively high electrical conductivity, measuring the resistance distribution of the epidermis and the thickness of the hypodermis related to this distribution by using the above characteristics can achieve personal authentication.

With the personal authentication system and the personal authentication method according to the present invention, a current is applied to the epidermis and the dermis by using the first electrode having a small contact area with the skin and the second electrode having a large contact area with the skin. Since the second electrode has a large area, the resistance of the epidermis in contact with the second electrode becomes negligibly low and it is possible to measure the resistance of the epidermis in contact with the first electrode.

According to the present invention, the structure of the hypodermis, which cannot be externally detected with ease, is used for personal authentication, thus preventing an imposter from posing as authentic person and providing increased security.

The simple structure of the personal authentication system allows the system to be downsized and to be produced at a low price, thus providing higher practicability.

The personal authentication can be performed without perception by a person to be authenticated in this easy-to-use personal authentication system.

It is possible to continuously perform personal authentication, thus providing increased security.

The above and other objects, features, and advantages of the present invention will become clear from the following description of the preferred embodiments taken in conjunction with the accompanying drawings.

BRIEF DESCRIPTION OF THE DRAWINGS

FIG. 3A shows another exemplary structure of the measuring device for measuring the resistances of the epidermis in the personal authentication system according to the first embodiment of the present invention;

FIG. 3B shows the two-dimensional distribution of the measured resistances;

DESCRIPTION OF THE PREFERRED EMBODIMENTS

Embodiments of the present invention will now be described with reference to the attached drawings.

First Embodiment

Figure 1A:
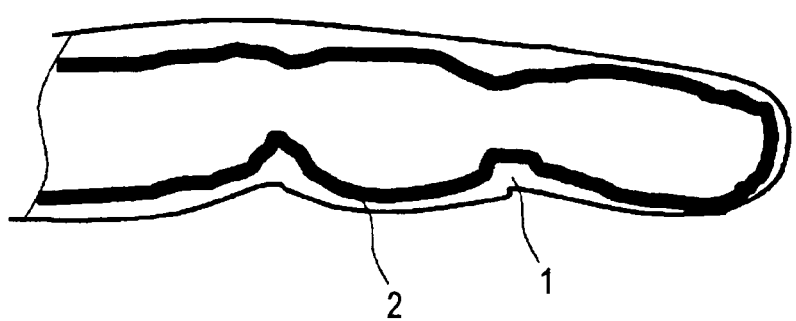
FIG. 1A shows the structure of finger skin.

FIG. 1A shows human finger skin having an epidermis 1, a dermis 2, and a hypodermis in that order, viewed from the surface thereof.

It takes about four weeks for old human skin to be replaced with new skin. Patterns of the epidermis 1, such as fingerprints, are formed of the dermis 2. The dermis 2 has the homeostatic pattern on its upper layer, so that the epidermis 1 over the dermis 2 exhibits stable resistance distribution and therefore individual bodies can be identified.

However, since the fingerprints are external patterns of the epidermis 1, high-precision reproduction thereof undesirably permits an imposter to pose as an authenticated person. Additionally, the fingerprints stay at places that are touched with a hand, thus possibly being reproduced.

According to the first embodiment, a person is authenticated by using the information inside the body, which cannot be externally detected with ease, unlike the fingerprints, iris, or the like that is visible from outside. Specifically, an individual body is identified by using the thickness distribution of the epidermis 1 to authenticate the person.

Figure 1B:
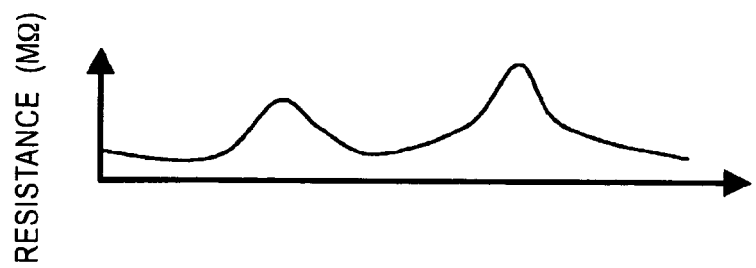
FIG. 1B shows the distribution of electrical resistances of the epidermis.

While the epidermis 1 basically exhibits high insulation properties, the dermis 2 has relatively high electrical conductivity. Measuring the electrical resistances and its distribution in the epidermis 1 by using these characteristics gives the thickness distribution of the epidermis 1, in which the skin has high resistance in its thick parts and low resistance in its thin parts, as shown in FIG. 1B. The thickness distribution can be used to authenticate an individual.

In order to measure the electrical resistances of the epidermis 1 and its distribution, the local resistances of the epidermis 1 must be measured one by one. Although the local resistances of the epidermis 1 can be measured one by one if the skin can be pinched between an outer electrode and an inner electrode at multiple points of the epidermis 1, electrodes cannot be provided inside the epidermis 1.

Providing two minor electrodes on the surface of the epidermis 1 to measure the electrical resistance gives only the resistance of the epidermis 1 between the two electrodes, thus it is not possible to detect the thickness of the skin.

Figure 2:
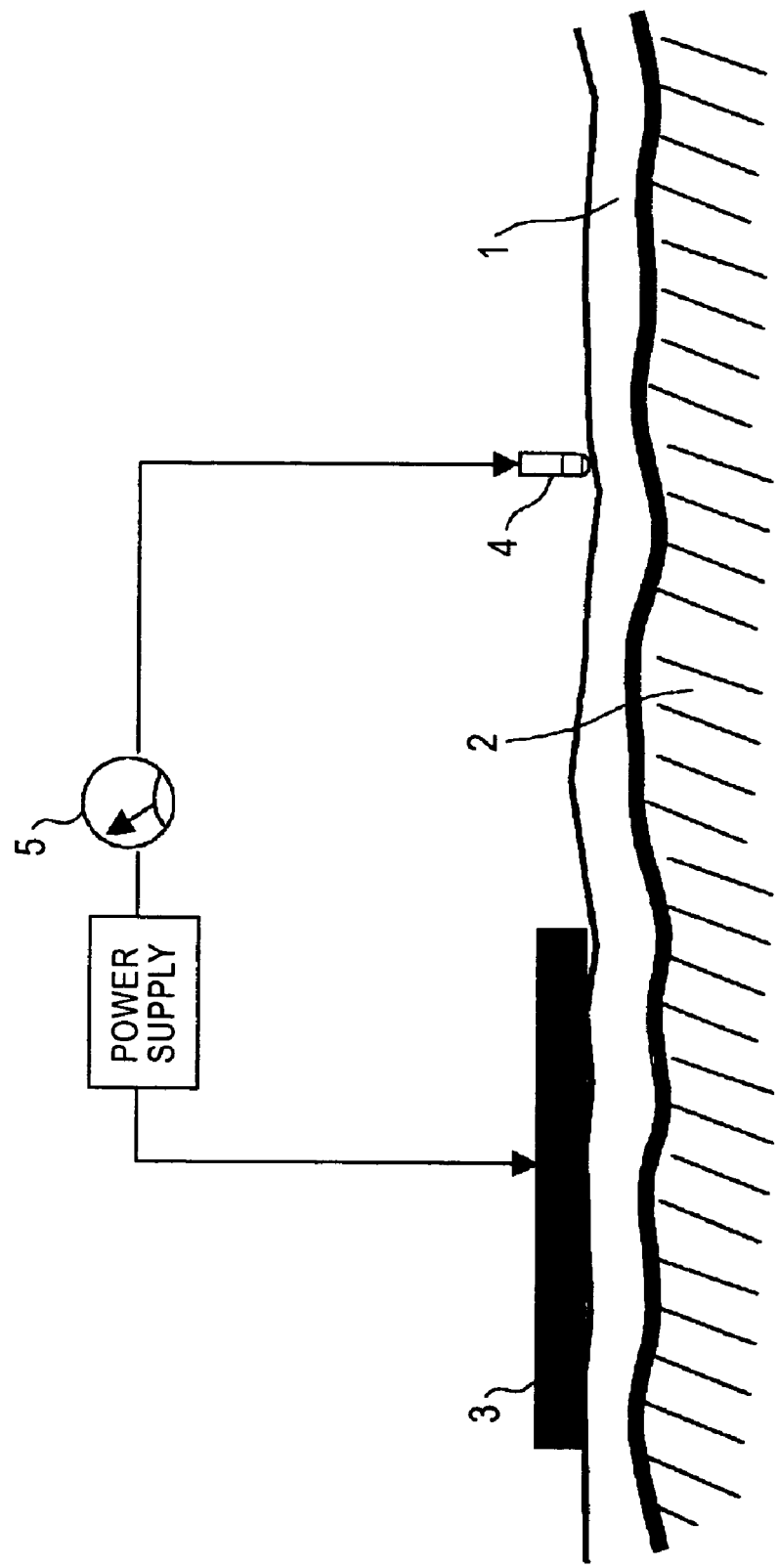
FIG. 2 shows an exemplary structure of the measuring device for measuring the resistances of the epidermis in a personal authentication system according to a first embodiment of the present invention.

According to the first embodiment, the local resistances of the epidermis 1 at multiple points are measured by using a measuring device having the basic structure shown in FIG. 2 to determine the resistance distribution.

FIG. 2 shows the basic structure of the measuring device for measuring the resistance distribution on the epidermis 1, according to the first embodiment.

Referring to FIG. 2, the measuring device has a large plane electrode 3 disposed on the surface of the skin, a small micro electrode 4 apart from the plane electrode 3, and an ammeter 5 for measuring a current flowing into the epidermis 1 and the dermis 2 through the plane electrode 3 and the micro electrode 4.

The measuring device in FIG. 2 operates in the following manner.

When a predetermined amount of voltage is applied between the plane electrode 3 and the micro electrode 4 that are disposed on the surface of skin, a current flows between the plane electrode 3 and the micro electrode 4 through the epidermis 1 and the dermis 2. The flowing current is measured by the ammeter 5. The resistance of the epidermis 1 under the micro electrode 4 is measured based on the flowing current and the applied voltage.

Since the micro electrode 4 is placed at a position where the resistance is measured, the micro electrode 4 is hereinafter also called a measuring electrode and the plane electrode 3 is also called a conducting electrode.

The measuring electrode and the conducting electrode correspond to a "first electrode" and a "second electrode" of the present invention, respectively.

The plane electrode 3 is used for applying the current to the dermis 2 and internal tissue under the epidermis 1 due to its large area. Each point on the skin has a large resistance of several millions $\Omega$ to tens of millions $\Omega$. When the plane electrode 3 has a sufficiently large area, the contact area between the plane electrode 3 and the epidermis 1 becomes large and therefore the skin area in which the current flows below the plane electrode 3 becomes large. Accordingly, the resistance of this skin area becomes small.

In contrast, the area where the micro electrode 4 is in contact with the epidermis 1 is decreased so that the local resistances of the epidermis 1 do not vary due to the above large-area effect.

Applying a current in this manner to the dermis 2 having a relatively high electrical conductivity, under the epidermis 1, allows the resistances of multiple points on the epidermis 1 to be measured, like a case in which the epidermis 1 is pinched between an external electrode and an internal electrode to measure the resistance.

Since the absolute value of the resistance of skin actually varies in accordance with the temperature and humidity, the physical condition, the amount of sweat, and so on, a person cannot be identified by using the absolute value of the resistance. Accordingly, the resistance distribution that exhibits a constant pattern independent of the environmental conditions and the variation of the absolute value is used as body information to authenticate individuals.

Referring to FIG. 2, moving the micro electrode 4 little by little allows the resistances of multiple points of the epidermis 1 to be measured to determine the resistance distribution.

The resistance distribution in a larger area on the epidermis 1 can be easily measured by using a measuring device having the structure in FIG. 3A.

Referring to FIG. 3A, a measuring electrode 7 has a plurality of micro electrodes 7a arranged in a matrix and, for example, is in contact with and covered with the upper part of a finger 10. The plane electrode 3 is in contact with the bottom of the finger 10. One of the micro electrodes 7a in the measuring electrode 7 is selected and the local resistance of the finger skin is measured at the position of the selected micro electrode 7a using a pair of the selected micro electrode 7a and the plane electrode 3. The specific operation is similar to that of the measuring device shown in FIG. 2.

Since each point on the skin has a very large resistance, the resistances differ between points that are relatively close to each other. Hence, changing the measurement points one after another gives the resistance distribution of the entire finger skin.

The micro electrodes 7a are arranged in a two-dimensional plane on the measuring electrode 7, so that measuring the resistances of the positions of the micro electrodes 7a gives the two-dimensional distribution of the resistances or the thickness of the epidermis 1. FIG. 3B shows measured two-dimensional distribution 7b of the resistances of the epidermis 1 of the finger. Different resistances are indicated by different symbols. The micro electrodes 7a arranged at sufficiently small intervals achieves high-resolution images, thus providing the pattern on the epidermis 1. This pattern is, for example, fingerprints.

The micro electrodes 7a are spaced, for example, 1 mm apart.

Figure 4:
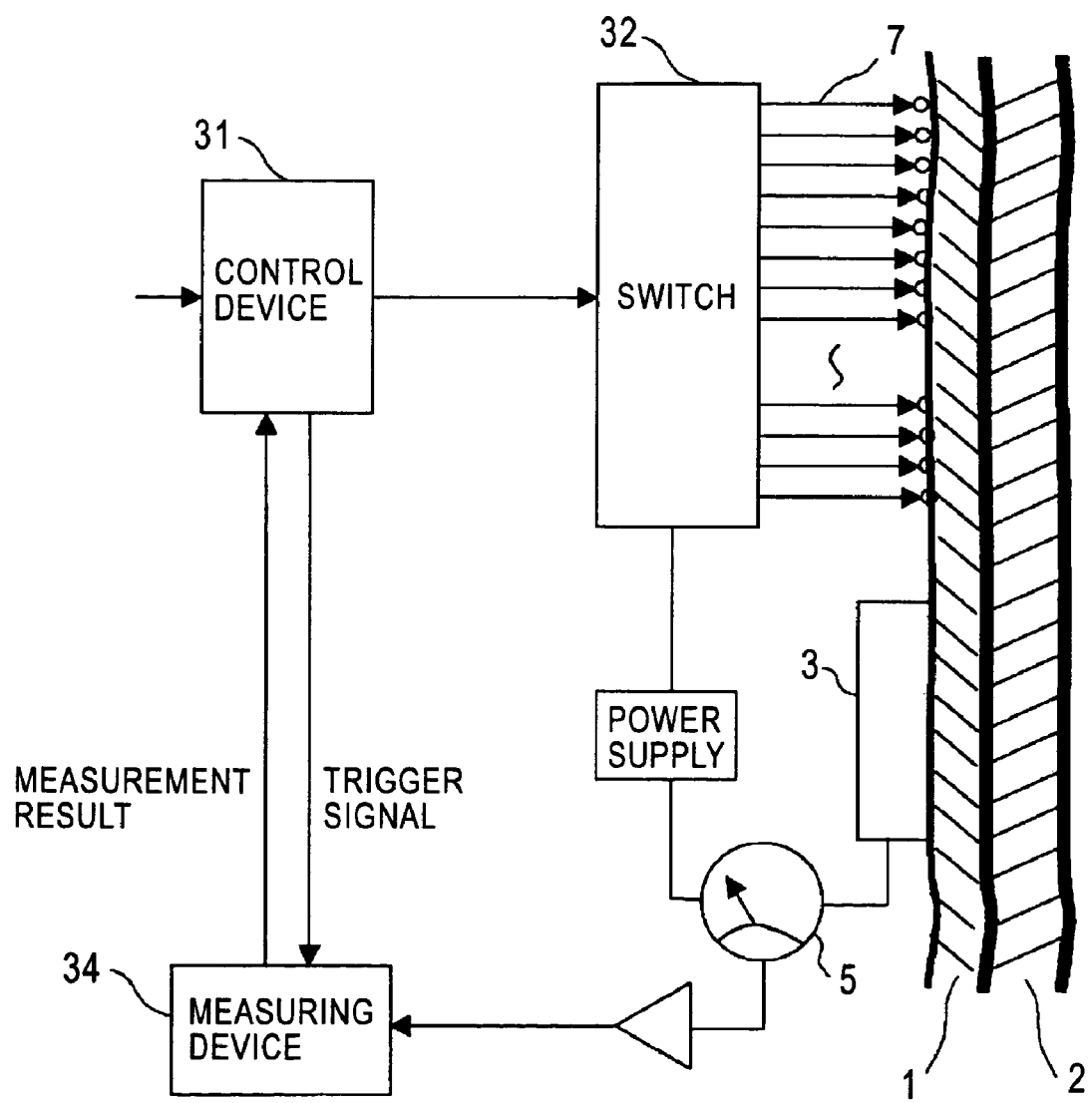
FIG. 4 shows an exemplary overall structure of the personal authentication system according to the first embodiment of the present invention.

FIG. 4 shows an exemplary overall structure of a personal authentication system for authenticating individuals by using the measuring device described above.

Referring to FIG. 4, the measuring electrode 7 having a plurality of measuring electrodes and the plane electrode 3 are in contact with the epidermis 1 to be measured.

A switch 32 is used to select a micro electrode 7a to be connected to the plane electrode 3 from among a plurality of micro electrodes 7a in the measuring electrode 7. A predetermined amount of voltage is applied between the plane electrode 3 and the selected micro electrode 7a for measurement. The ammeter 5 measures a current applied to the epidermis 1 and the dermis 2 through the plane electrode 3 and the selected micro electrode 7a to which the voltage is applied. A measuring device 34 processes the current supplied from the ammeter 5, and measures the skin resistance at the position of the selected micro electrode 7a and outputs the measured resistance to a control device 31.

The control device 31 outputs instructions for specifying the micro electrode 7a to be selected to the switch 32 and also outputs trigger signals for controlling the timing of operating the measuring device 34 to the measuring device 34. The control device 31 processes the resistances supplied from the measuring device 34 and determines the resistance distribution and the thickness distribution of the epidermis 1. The control device 31 then compares the determined distribution with the resistance distribution on the epidermis 1 of a person to be authenticated, which is measured in advance and stored in the memory (not shown) of the control device 31, to identify the person.

The personal authentication system in FIG. 4 operates in the following manner.

A person to be authenticated brings, for example, his/her finger into contact with the measuring electrode 7 and the plane electrode 3 to start the authentication. The control device 31 controls the switch 32 to select one of the micro electrodes 7a in the measuring electrode 7. A predetermined amount of voltage is applied between the plane electrode 3 and the selected micro electrode 7a and the resistance of the epidermis 1 under the selected micro electrode 7a is measured. Applying the voltage between the plane electrode 3 and the selected micro electrode 7a causes a current to be applied between the plane electrode 3 and the micro electrode 7a through the epidermis 1 and the dermis 2. The ammeter 5 measures the current and transmits the measured current to the measuring device 34. The measuring device 34 processes the current supplied from the ammeter 5 and measures the skin resistance below the micro electrode 7a. The measuring device 34 then outputs the measured resistance to the control device 31 at the timing of the trigger signals output from the control device 31. The control device 31 processes the resistances supplied from the measuring device 34 and determines the resistance distribution and the thickness distribution of the epidermis 1 at the authentication position. The control device 31 then compares the determined distribution with the resistance distribution on the epidermis 1 of a person to be authenticated, which is measured in advance and stored in the memory of the control device 31, to identify the person.

According to the first embodiment, personal authentication is performed by using the structure of the hypodermis that is not exposed and cannot externally be detected with ease, so that the authentication feature is unlikely to be stolen by others, thus preventing an imposter from posing as an authentic person and providing increased security.

The simple structure of the personal authentication system can be reduced in size and permits easy production, thus providing high practicability.

Authentication information can be imaged, thereby achieving automatic control by a computer.

Second Embodiment

The structure of a personal authentication system that measures the resistance distribution on the epidermis of skin to authenticate a person, according to a second embodiment of the present invention, will now be described. The same reference numerals are used in the second embodiment to identify the same components as in the first embodiment.

Figure 5:
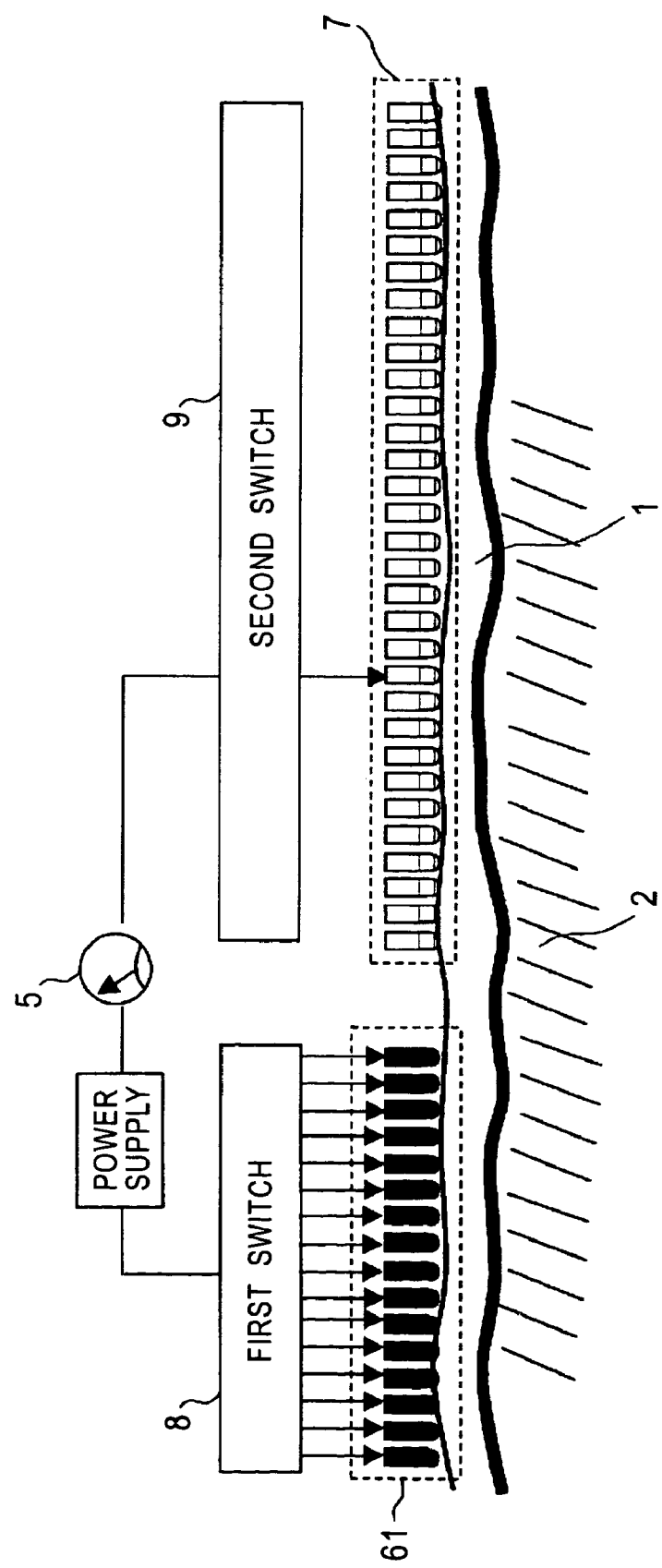
FIG. 5 shows an exemplary structure of the measuring device for measuring the resistances of the epidermis in a personal authentication system according to a second embodiment of the present invention.

FIG. 5 shows an example structure of the measuring device for measuring the resistances of the epidermis 1 in the personal authentication system according to the second embodiment.

Referring to FIG. 5, the measuring electrode 7 has a plurality of micro electrodes as in the first embodiment and a conducting electrode 61 also has a plurality of micro electrodes. A first switch 8 in a matrix form is used to select each micro electrode in the conducting electrode 61. A second switch 9 is used to select one micro electrode in the measuring electrode 7 to measure the resistance of the epidermis 1 at the position of the selected micro electrode.

For example, all the micro electrodes in the conducting electrode 61 are turned on with the first switch 8 for measurement.

The specific operation of the measuring device in FIG. 5 is similar to that of the measuring device of the first embodiment and therefore the description is omitted here.

Figure 6:
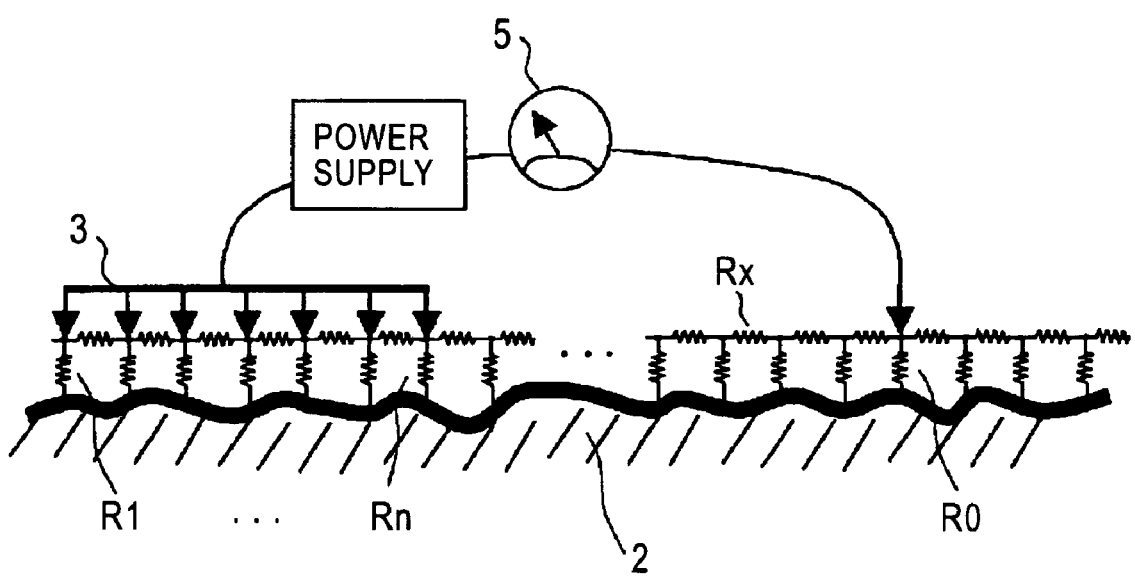
FIG. 6 a diagram showing the principle of measuring the resistances of the epidermis in the personal authentication system according to the second embodiment of the present invention.

FIG. 6 is a diagram showing the principle of measuring the resistances of the epidermis 1 with the measuring device of the second embodiment.

Referring to FIG. 6, each local point of the epidermis 1 functions as a resistor. The resistance of the skin down to the hypodermis under a selected micro electrode in the measuring electrode 7 is represented by R0, the resistances of the skin down to the hypodermis under the micro electrodes in a conducting electrode 3 are represented by R1, . . . , Rn, and the average resistance of the epidermis 1 between adjoining micro electrodes is represented by Rx, where n is the number of micro electrodes in the conducting electrode 3.

Since the distance between adjoining micro electrodes is normally much larger than the thickness of the epidermis 1, Rx is much larger than R0, R1, . . . , or Rn, thus assuming Rx as infinite in the following description.

In particular, a predetermined difference in voltage exists between the conducting electrode 3 and the measuring electrode 7. Hence, it is assumed that the conducting electrode 3 is sufficiently apart from the measuring electrode 7 such that electrical leakage does not occur between the conducting electrode 3 and the measuring electrode 7.

Under these conditions, the resistance r measured with the measuring device in FIG. 5 is given by the following equations:

[Formula 1]

$$r = R0 + 1/(1/R1 + \ldots + 1/Rn) \quad (1)$$

[Formula 2]

$$r = R0 + R/n \quad (2)$$

where R represents the average resistance of the resistances R1, . . . , Rn.

If the number n of the micro electrodes in the conducting electrode 3 is sufficiently large, $R/n \cong 0$ and the measured resistance becomes approximately zero.

The principle shown in FIG. 6 also describes the measurement method with the measuring device using the plane electrode 3, according to the first embodiment.

Switching the selected micro electrode one after another in the measuring electrode 7 in the measuring device in FIG. 5 shifts the measuring point, so that the resistance of the skin at each point in the skin area covered with the measuring electrode 7 can be measured, thus providing the resistance distribution and the thickness distribution of the skin.

Selecting one micro electrode in the conducting electrode 3 and one micro electrode in the measuring electrode 7 permits the resistance measurement between the two points. For example, applying a voltage between the selected two points permits the estimation of the resistance at the measuring point. Such measurement is necessary for the calibration of a measuring device and so on.

Figure 7B:
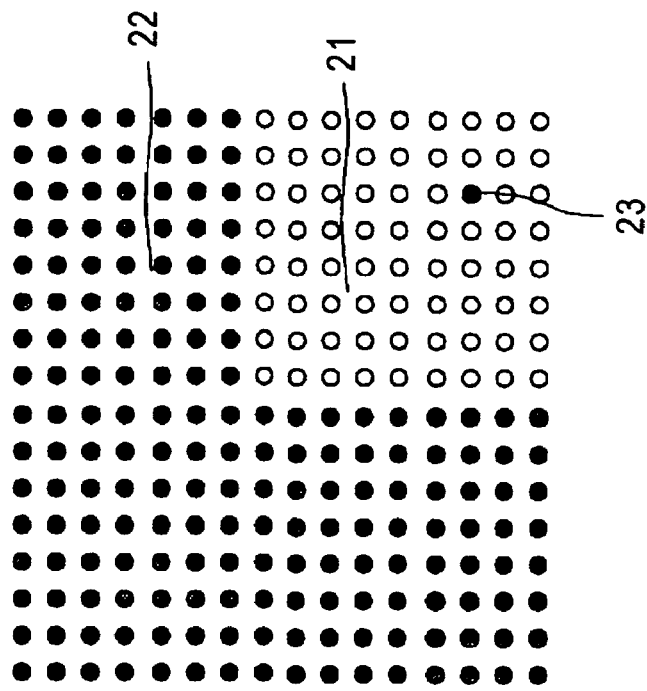
FIGS. 7A and 7B show other exemplary structures of the measuring device for measuring the resistances of the epidermis in the personal authentication system according to the second embodiment of the present invention.
Figure 7A:
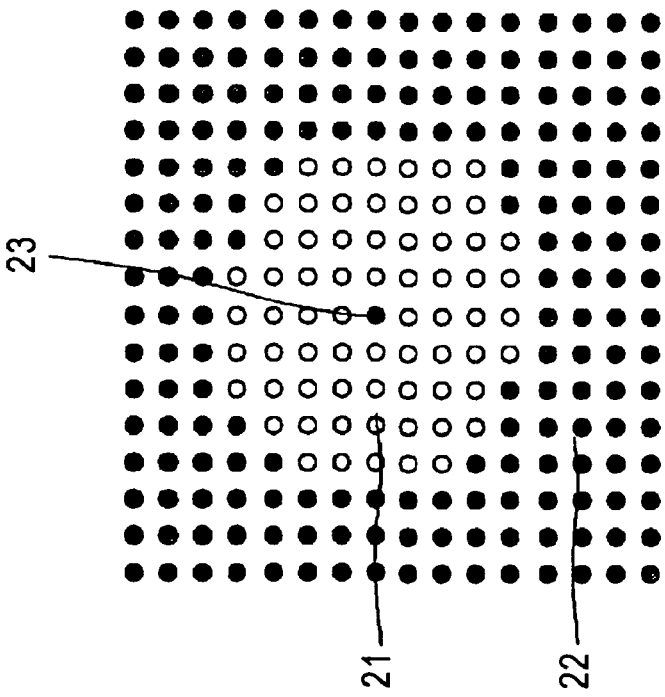

FIGS. 7A and 7B show other exemplary structures of the measuring device for measuring the resistances of the epidermis 1 in the personal authentication system according to the second embodiment.

Referring to FIGS. 7A and 7B, the micro electrodes in the conducting electrode 61 in FIG. 5 are not distinguished from the micro electrodes in the measuring electrode 7 in FIG. 5 and they are collectively arranged in parallel.

For example, referring to FIG. 7A, a black micro electrode 23 at the measuring point is selected from among all of the micro electrodes and the micro electrode 23 functions as a measuring electrode. A plurality of gray micro electrodes apart from the measuring electrode 23 constitutes a conducting electrode 22. White micro electrodes surrounded by the conducting electrode 22 function as a separator 21 for suppressing a current leaking through the skin between the measuring electrode 23 and the conducting electrode 22. A voltage is not applied to the skin under the separator 21.

As described above, the number of the micro electrodes in the conducting electrode 22 must be sufficiently large in order to measure the local resistances of the epidermis 1.

The electrical leakage must be as small as possible between the measuring electrode 23 and the conducting electrode 22 to produce a negligible error in the resistance of the skin between the measuring electrode 23 and the conducting electrode 22 for maintaining the accuracy of the measurement to a certain level. For this purpose, the measuring electrode 23 is sufficiently spaced apart from the conducting electrode 22. Namely, an area functioning as the separator 21 must be provided between the conducting electrode 22 and the measuring electrode 23.

Appropriately controlling the number of the micro electrodes in the conducting electrode 22 and the area functioning as the separator 21 allows the resistances of the epidermis 1 to be measured.

The resistances of the epidermis 1 in the skin area covered with all of the micro electrodes can be efficiently measured by switching the measuring electrode 23 to be used for measurement to another micro electrode in an electronic circuit to change the positions of the measuring electrode 23, the conducting electrode 22, and the separator 21, as shown in FIG. 7B. Even when the measuring point is near an edge, controlling the spacing of the measuring electrode 23, the conducting electrode 22, and the separator 21 as in FIG. 7B permits a uniform measurement independent of the measuring point.

The micro electrode functioning as the measuring electrode 23 is selected with a switch group made of semiconductor material in a matrix form.

When the fixed conducting electrode is used as in FIGS. 2, 3A, 3B, and 5, the area occupied by the conducting electrode cannot be measured and large errors in the measured value occur in the vicinity of the conducting electrode. The structures in FIGS. 7A and 7B can overcome these drawbacks.

As described above, the absolute value of the resistance of the skin usually varies in accordance with the humidity and temperature, the physical condition, the amount of sweat, and so on. Referring to FIGS. 5, 7A, and 7B, since the conducting electrode has a plurality of micro electrodes, a gap is generated between the skin and the conducting electrode and therefore air is likely to pass through, thus keeping the skin dry. Hence, for example, a device for causing the air to flow between the conducting electrode and the skin is provided in the vicinity of the measuring device.

When the skin becomes moist with sweat, the insulation properties of the skin is deteriorated. Hence, in FIG. 5, increasing the distance between the conducting electrode 61 and the measuring electrode 7 can correct the resistance to some extent. In FIGS. 7A and 7B, extending the area of the separator 21 can correct the resistance to some extent.

The change in conditions is handled by, for example, collecting in advance a variety of personal authentication data under various temperature or humidity conditions or various physical conditions in order to accommodate the change of the absolute value of the skin resistance. A measuring system of temperature, humidity, or the like for measuring calibration data may be provided.

Figure 8A:
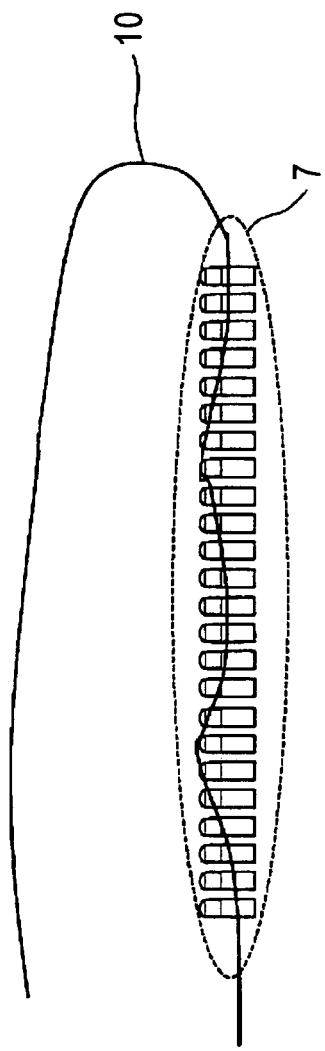
FIG. 8A shows a state in which a finger is in contact with micro electrodes.
Figure 8B:
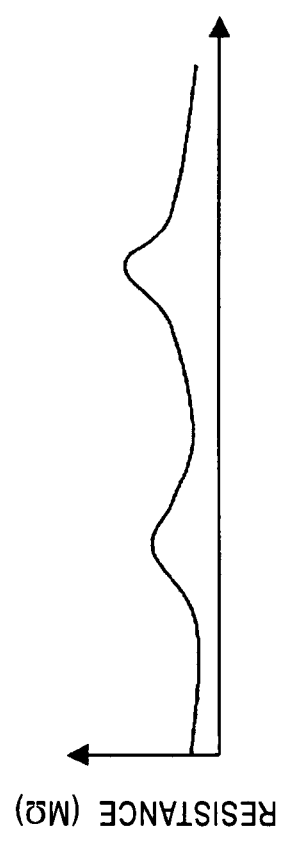
FIG. 8B shows the one-dimension distribution of the resistances measured by the personal authentication system according to the second embodiment of the present invention.
Figure 8C:
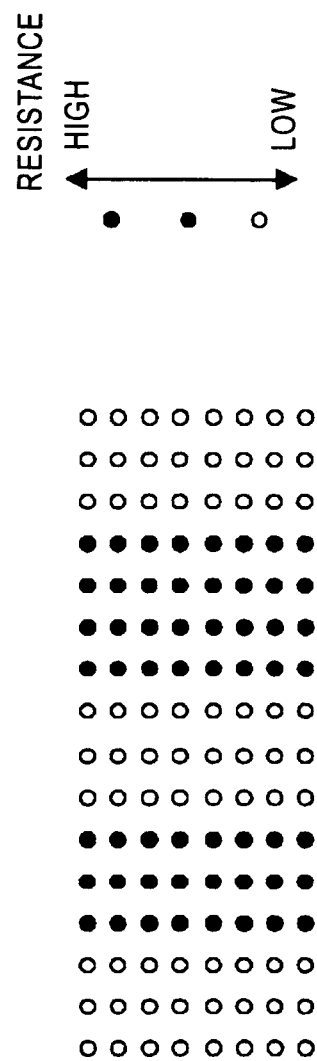
FIG. 8C shows the two-dimensional distribution of the resistances measured by the personal authentication system according to the second embodiment of the present invention.

With the measuring device in FIG. 5, FIG. 7A, or FIG. 7B, bringing a finger 10 into contact with the micro electrodes as shown in FIG. 8A gives the one-dimension distribution of the resistances as shown in FIG. 8B. The micro electrodes are arranged in a two-dimensional plane, so that measuring the resistances of the positions of the micro electrodes gives the two-dimensional distribution of the resistances or the thickness of the skin. FIG. 8C shows the two-dimensional distribution of the measured resistances of the epidermis of the finger 10. Different resistances are indicated by different symbols. The micro electrodes arranged at sufficiently small intervals achieves high-resolution images, thus providing the pattern on the epidermis. This pattern is, for example, fingerprints. The micro electrodes are spaced, for example, 1 mm apart.

The measured resistance distribution of the epidermis is compared with the resistance distribution of the skin that is measured in advance in the same region as in this measurement for a person to be authenticated in order to perform personal authentication.

An authentication method that uses the measured resistance distribution of the epidermis and the physical features and therefore is not subject to be affected by external environment can be realized.

The positions of the joints of a finger can be identified by using the resistance distribution, as shown in FIG. 8B or 8C, of the epidermis of the hand or the finger.

The hypodermis in the joints of a finger is greatly different from the hypodermis in other regions. Each time a finger is bent, the epidermis under the joints becomes thicker than the epidermis of other regions. Hence, measuring the resistance distribution on the epidermis in a larger area, such as a whole finger 10 or a hand 12, as shown in FIG. 9A, can identify the positions of joints 13, indicated by bold lines, which has extremely high resistances.

The distance between joints of a finger, the length of the finger, the size of a hand, and so on can be identified based on the positions of the finger joints. Since the distance between joints of the finger, the length of the finger, the size of the hand, and so on differ from person to person, these features can be used to authenticate a person. Using combined features widens the individual differences.

The structure of the hand can be determined by using the positions of the finger joints. The structure of the hand can be used for identifying the positions in the hand, as described below.

Further micrifying the micro electrodes gives small patterns of the epidermis and the dermis based on the thickness distribution of the epidermis determined from the measured resistance distribution of the epidermis. These small patterns are, for example, fingerprints.

Figure 9B:
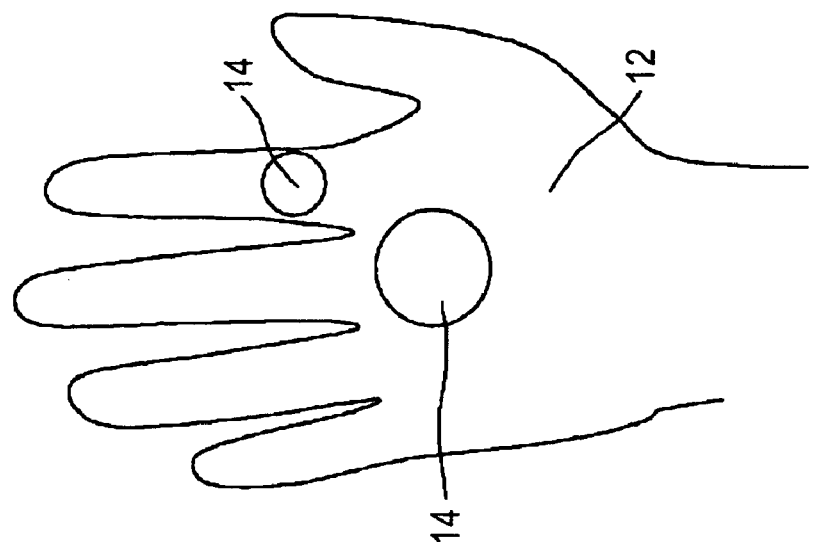
FIGS. 9A and 9B are diagrams describing a method of identifying positions on a palm based on the measured resistance distribution on the epidermis of the palm, according to the second embodiment of the present invention.
Figure 9A:
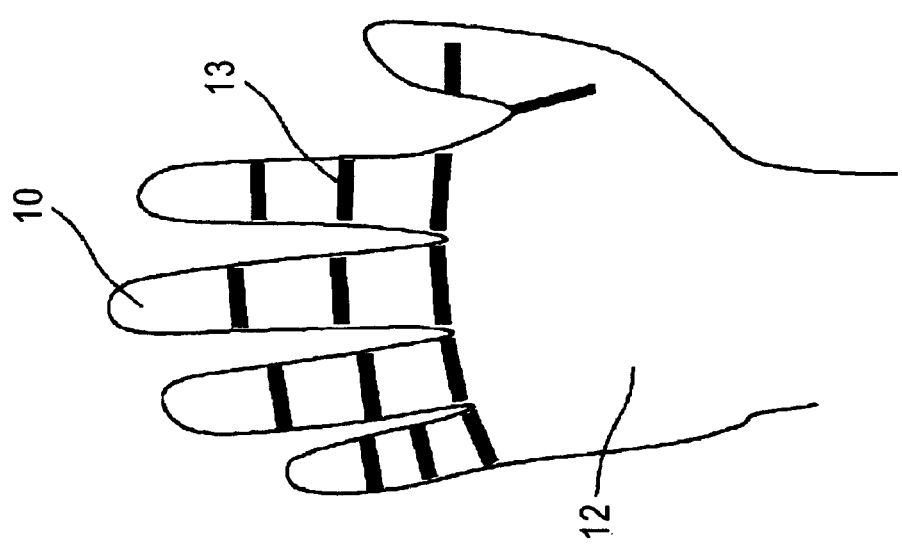

For example, as shown in FIG. 9B, the identification of the positions in the hand 12 is required for using the patterns described above, which are measured in a predetermined area 14 on the hand 12, in personal authentication. For this purpose, the method of determining the structure of the hand from the positions of the joints in FIG. 9A can be used. The positions of the finger joints that have been measured simultaneously with the patterns in the area 14 are used to identify the position of the area 14. Since fine patterns measured in the area 14 are data varying from person to person, personal authentication with higher reliability can be achieved.

In addition to the methods described above, for example, the features of the skin at a fingertip can be used for personal authentication. Since fingertips are frequently used in our daily life, the thickness of the epidermis at the fingertips varies in accordance with the frequency of use, thus making differences from person to person. This feature is also used in personal authentication as a parameter for distinguishing individuals.

Wrinkles, such as lines of a palm, can also be measured. The areas of depressed lines, for example, in a palm, which are difficult to contact, have larger resistances and the skin of the joints is large in thickness, so that these areas can be identified based on the measurement results of the resistances. Combination of the wrinkles, which are liable to appear on the surface of skin, with the state of their hypodermis provides more complicated elements for personal authentication.

According to the second embodiment, the structure of the hypodermis, which cannot be externally detected with ease, is used for personal authentication, thus preventing an imposter from posing as an authentic person and providing increased security.

The simple structure of the personal authentication system allows the system to be downsized and to be produced at a low price, thus providing higher practicability.

It is possible to image authentication information, so that automatic management with a computer is achieved.

Since the conducting electrode has a plurality of micro electrodes, a gap is generated between the conducting electrode and the skin and therefore the skin is likely to become dry. The measurement between two points can realize measurement for calibrating the resistances. Additionally, the measurement range expands and the measurement accuracy is improved.

Characteristic elements, such as finger joints, detailed patterns of skin, wrinkles, and fingertips, can be used to perform personal authentication with higher reliability.

Third Embodiment

Applications of the personal authentication method and the personal authentication system described above, according to a third embodiment, will now be described.

The personal authentication systems according to the first and second embodiments can be produced in the form of a large-scaled integrated circuit. Micro electrodes and switches in a matrix form for connecting the micro electrodes are required for this application. These switches must have sufficiently high insulation properties against the resistances of the skin.

When a conducting electrode that is a plane electrode is used, current or voltage is measured between a pair of the plane electrode and a micro electrode functioning as a measuring electrode, so that an input buffer having at least one high-impedance input is required.

When a conducting electrode having a plurality of micro electrodes is used, all or part of the other micro electrodes that are sufficiently apart from a micro electrode functioning as the measuring electrode function as a conducting electrode.

Figure 10:
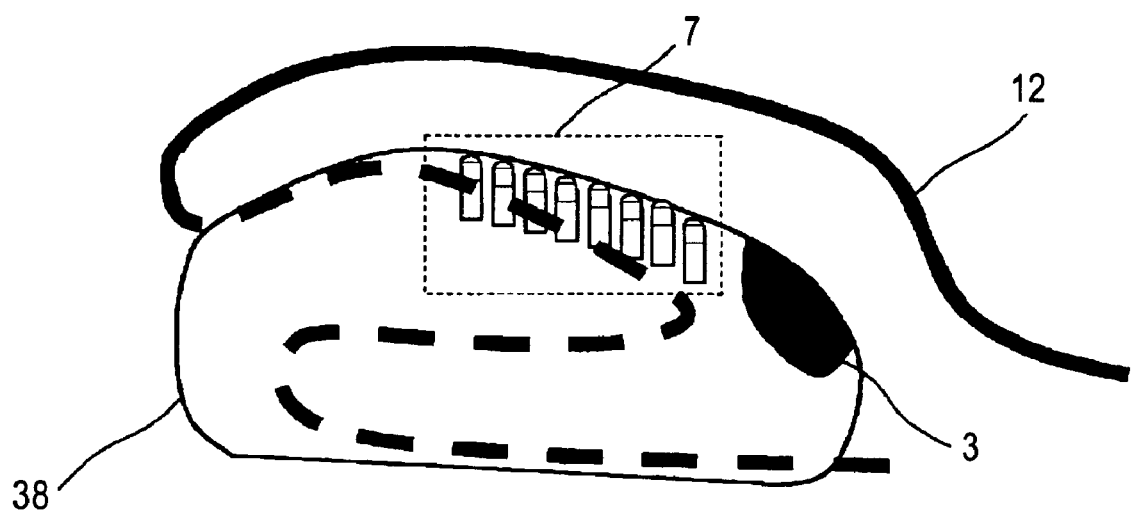
FIG. 10 is a diagram showing a personal authentication system according to a third embodiment of the present invention, which is applied to a computer mouse.

FIG. 10 is a diagram showing a personal authentication system applied to a computer mouse 38.

Referring to FIG. 10, the measuring electrode 7 having a plurality of micro electrodes and the plane electrode 3 are disposed at positions where the hand 12 is always in contact with the computer mouse 38. The resistance distribution of the epidermis or the wrinkles, such as the lines of the palm, in the areas beneath the hand 12 that is in contact with the electrodes are always measured upon booting of the computer or during use, thereby continuously performing personal authentication without perception by the user.

Figure 11:
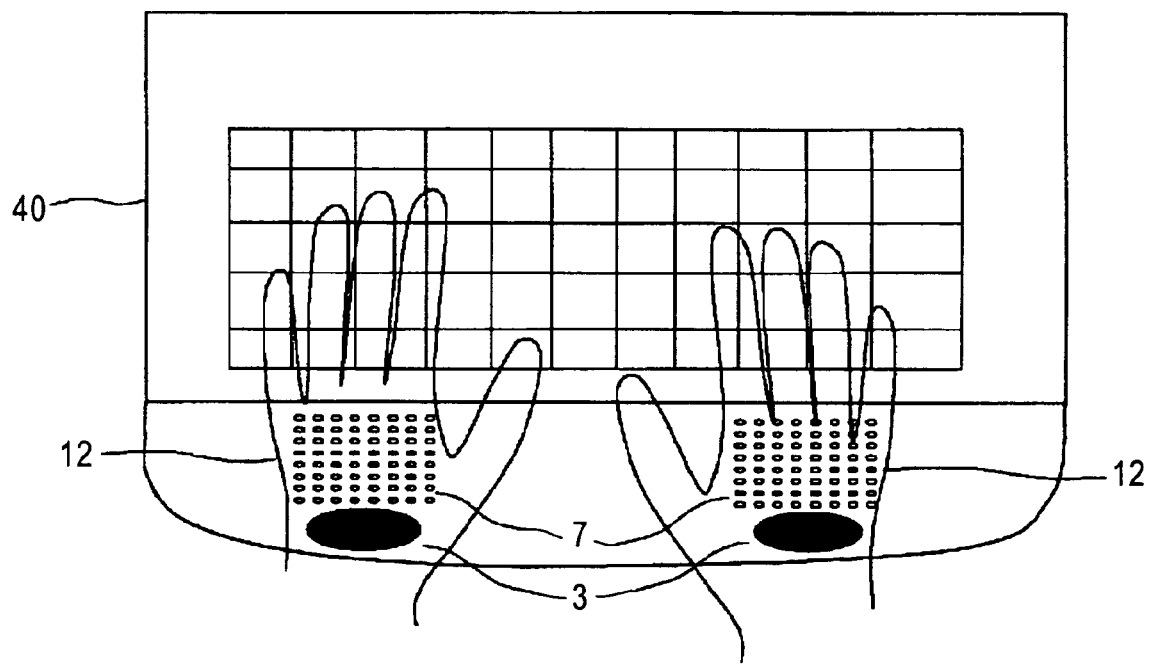
FIG. 11 is a diagram showing another personal authentication system according to the third embodiment of the present invention, which is applied to a computer keyboard.

FIG. 11 is a diagram showing a personal authentication system applied to a computer keyboard 40.

Referring to FIG. 11, the measuring electrode 7 having a plurality of micro electrodes and the plane electrode 3 are disposed at positions where the hand 12 is always in contact with the computer keyboard 40. The resistance distribution of the epidermis or the wrinkles, such as the lines of the palm, in the areas beneath the hand 12 that is in contact with the electrodes are always measured upon booting of the computer or during use, thereby continuously performing personal authentication without perception by the user.

Figure 12:
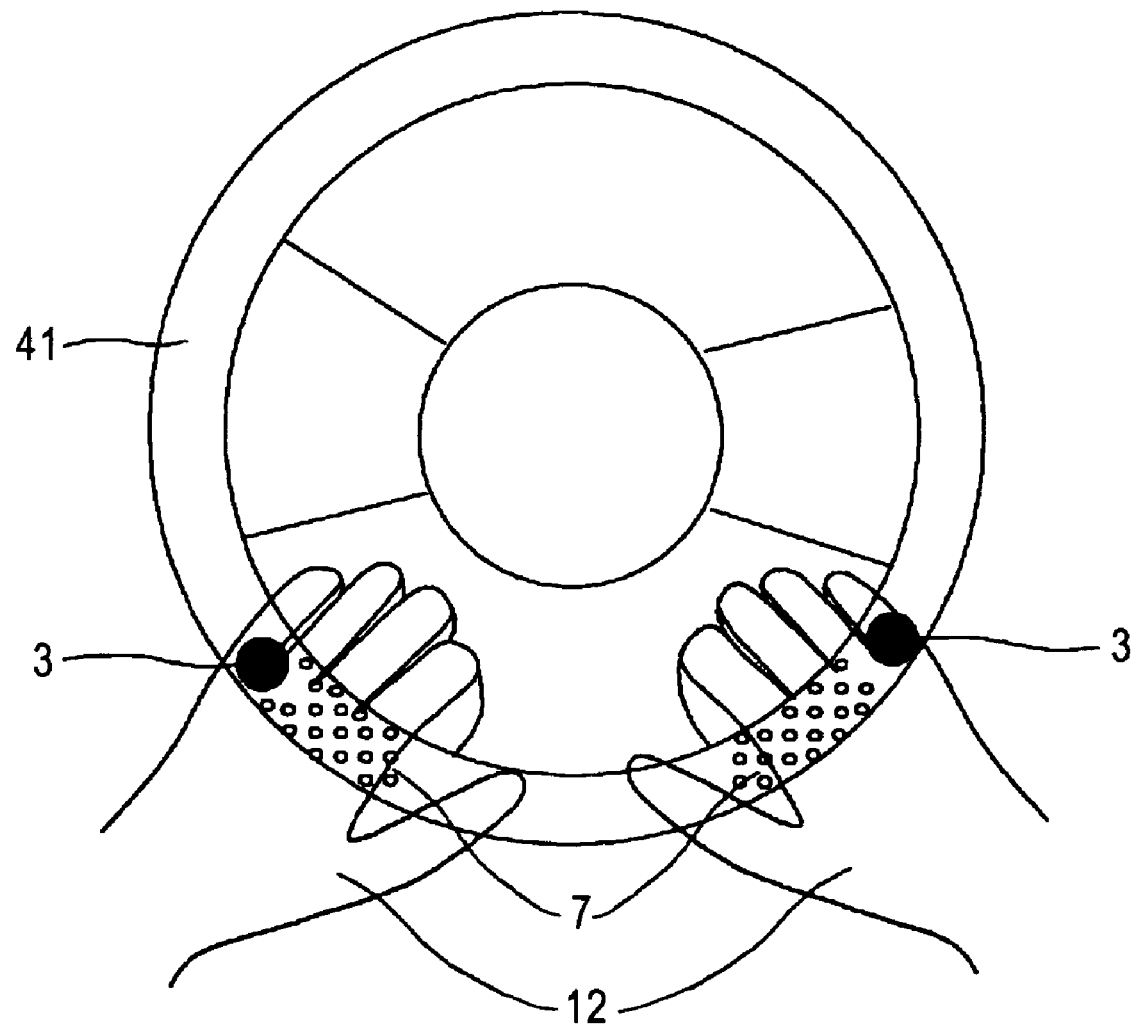
FIG. 12 is a diagram showing another personal authentication system according to the third embodiment of the present invention, which is applied to the steering wheel of a car for personal authentication during driving.

FIG. 12 is a diagram showing a personal authentication system applied to a steering wheel 41.

Referring to FIG. 12, the measuring electrode 7 having a plurality of micro electrodes and the plane electrode 3 are disposed at positions where the hand 12 is always in contact with the steering wheel 41. The resistance distribution of the epidermis or the wrinkles, such as the lines of the palm, in the areas beneath the hand 12 that is in contact with the electrodes are always measured upon starting of the car or while driving, thereby continuously performing personal authentication without perception by the driver.

Figure 13:
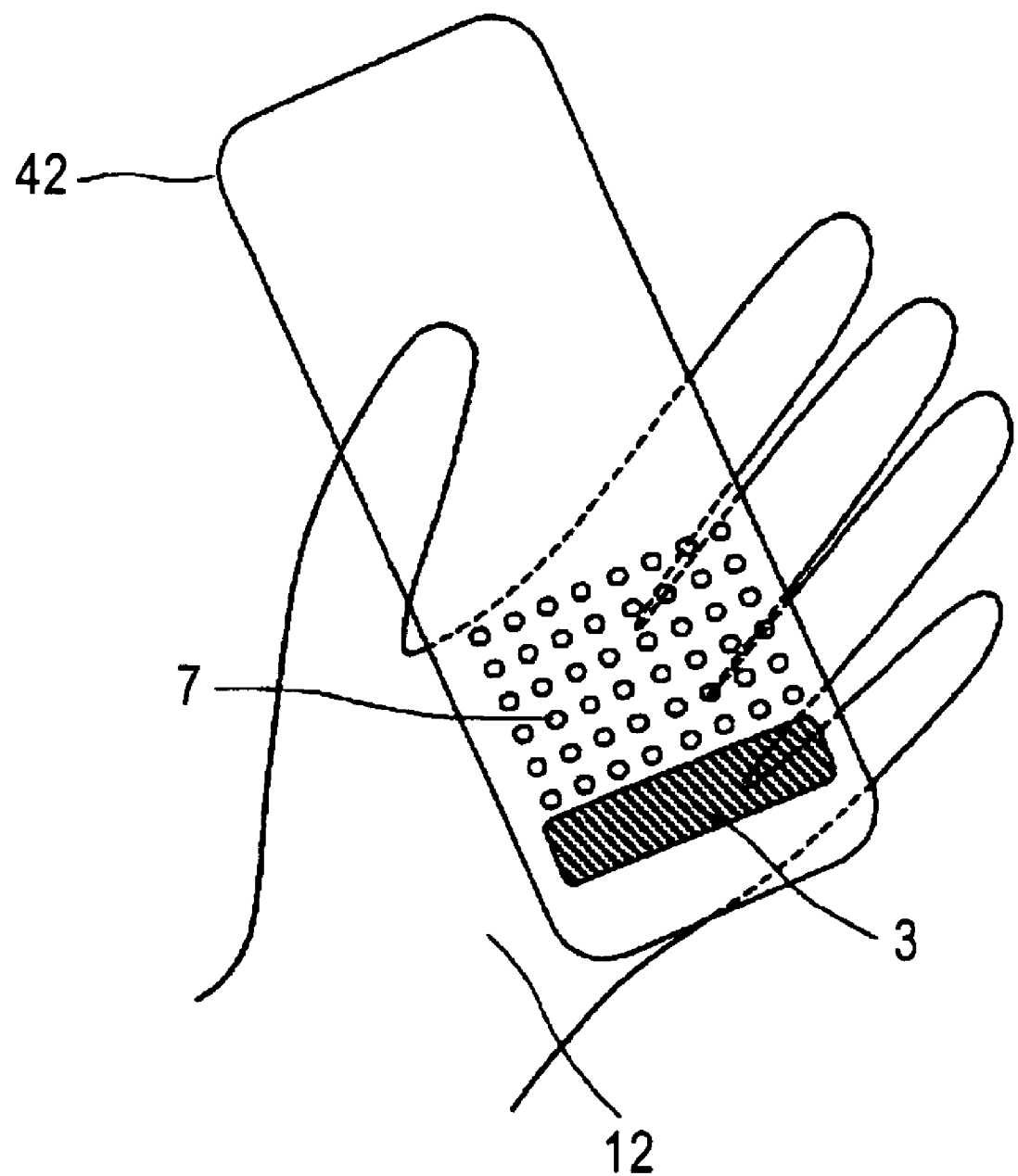
FIG. 13 is a diagram showing another personal authentication system according to the third embodiment of the present invention, which is applied to a PDA.

FIG. 13 is a diagram showing a personal authentication system applied to a personal digital assistant (PDA) 42.

Referring to FIG. 13, the measuring electrode 7 having a plurality of micro electrodes and the plane electrode 3 are disposed at positions where the hand 12 is always in contact with the PDA 42. The resistance distribution of the epidermis or the wrinkles, such as the lines of the palm, in the areas beneath the hand 12 that is in contact with the electrodes are always measured at the time of turning on the PDA 42 or during use, thereby continuously performing personal authentication without perception by the user.

Recent mobile phones, PDAs, or the like that are resistant to software tampering incorporate a relatively high-throughput CPU, so that almost all signal processing can be performed in the built-in CPU. In such cases, a detection system including an electrode group, the switches therefor, an A/D converter, and so on can be produced at a significantly low price.

Although the plane electrode 3 is used as a conducting electrode in this embodiment, a conducting electrode having a plurality of micro electrodes may be used.

Applications of the personal authentication system and the personal authentication method of the present invention are not limited to the examples described above.

According to the third embodiment, the structure of the hypodermis, which cannot be externally detected with ease, is used for personal authentication, thus preventing an imposter from posing as an authentic person and providing increased security.

The simple structure of the personal authentication system allows the system to be downsized and to be produced at a low price, thus providing higher practicability.

The personal authentication can be performed without perception by a person to be authenticated in this easy-to-use personal authentication system.

It is possible to continuously perform personal authentication with the personal authentication system of this embodiment, thus providing increased security.

While the present invention has been described in its preferred embodiments, it is to be distinctly understood that the invention is not limited thereto but various changes and modifications may be made without departing from the sprit and scope of the invention.

The structure of the personal authentication system according to the first embodiment is an example and the present invention is not limited to this structure. Other structures may be embodied as long as the object of the present invention is attained.

With the personal authentication system of the present invention, it is possible to measure the capacitance between the dermis and the epidermis, in addition to the resistances of the epidermis, for personal authentication. Although it is not easy to measure the capacitance owing to the internal resistance in this case, higher impedance can be achieved depending on the frequency band at which the measurement is performed. The contact area of each electrode must be rather large.

What is claimed is:

1. A personal authentication system comprising:
   a first electrode that is disposed in a first skin area of a person to be authenticated;
   a second electrode that is disposed in a second skin area apart from the first skin area, the contact surface between the second electrode and the second skin area having a predetermined area such that the resistance of the epidermis in the second skin area becomes substantially zero when an electric potential is generated between the first electrode and the second electrode;
   a measuring unit for measuring the resistance distribution of the epidermis in the first skin area based on a predetermined voltage that is applied between the first electrode and the second electrode and a current flowing between the first electrode and the second electrode through the body, including the skin, of the person to be authenticated; and
   an authentication unit that stores the resistance distribution data, which is measured in advance, of the epidermis in the first skin area of a validated person, for comparing the resistance distribution data of the epidermis in the first skin area of the person to be authenticated, the resistance distribution being measured with the measuring unit, with at least part of the stored resistance distribution data of the epidermis of the validated person to validate the person to be authenticated.

2. A personal authentication system according to claim 1, wherein the contact surface between the first electrode and the first skin area has a predetermined area such that the resistance of the epidermis in the first skin area does not substantially vary when an electric potential is generated between the first electrode and the second electrode.

3. A personal authentication system according to claim 1, wherein the distance between the first electrode and the second electrode is longer than a distance in a case in which electrical leakage begins to occur between the first electrode and the second electrode through skin upon generation of an electric potential between the first electrode and the second electrode.

4. A personal authentication system according to claim 1, wherein first electrodes are disposed on a plurality of fingers of the person to be authenticated, and
wherein the measuring unit measures the resistance distribution of the epidermis on the plurality of fingers to identify the positions in the hand of the person to be authenticated based on the resistance distribution on the epidermis near the joints of the fingers.

5. A personal authentication system according to claim 1, wherein the measuring unit measures the two-dimensional resistance distribution of the epidermis in the first skin area to determine the patterns on the surface in the first skin area based on the measured two-dimensional resistance distribution.

6. A personal authentication system according to claim 1, wherein the second electrode is a plane electrode.

7. A personal authentication method comprising the steps of:
   measuring the resistance distribution of the epidermis in a first skin area, based on a voltage that is applied between a first electrode that is disposed in the first skin area of a person to be authenticated and a second electrode that is disposed in a second skin area apart from the first skin area, the contact surface between the second electrode and the second skin area having a predetermined area such that the resistance of the epidermis in the second skin area becomes substantially zero when an electric potential is generated between the first electrode and the second electrode, and a current flowing between the first electrode and the second electrode through the body, including the skin, of the person to be authenticated; and
   comparing the resistance distribution data of the epidermis in the first skin area of the person to be authenticated, the resistance distribution being measured with the measuring unit, with at least part of the resistance distribution data, which is measured in advance, of the epidermis of a validated person to validate the person to be authenticated.

8. A personal authentication system comprising:
   a first electrode that is disposed in a first skin area of a person to be authenticated;
   a second electrode that is disposed in a second skin area apart from the first skin area and has a sufficiently larger area than the first electrode;
   a measuring unit for measuring the resistance distribution of the epidermis in the first skin area based on a predetermined voltage that is applied between the first electrode and the second electrode and a current flowing between the first electrode and the second electrode through the body, including the skin, of the person to be authenticated; and
   an authentication unit for comparing the measured resistance distribution with at least part of the resistance distribution data of the epidermis of a validated person, who is registered in advance, to validate the person to be authenticated.

9. A personal authentication system according to claim 8, wherein the second electrode is a plane electrode.

* * * * *